Patented Jan. 2, 1923.

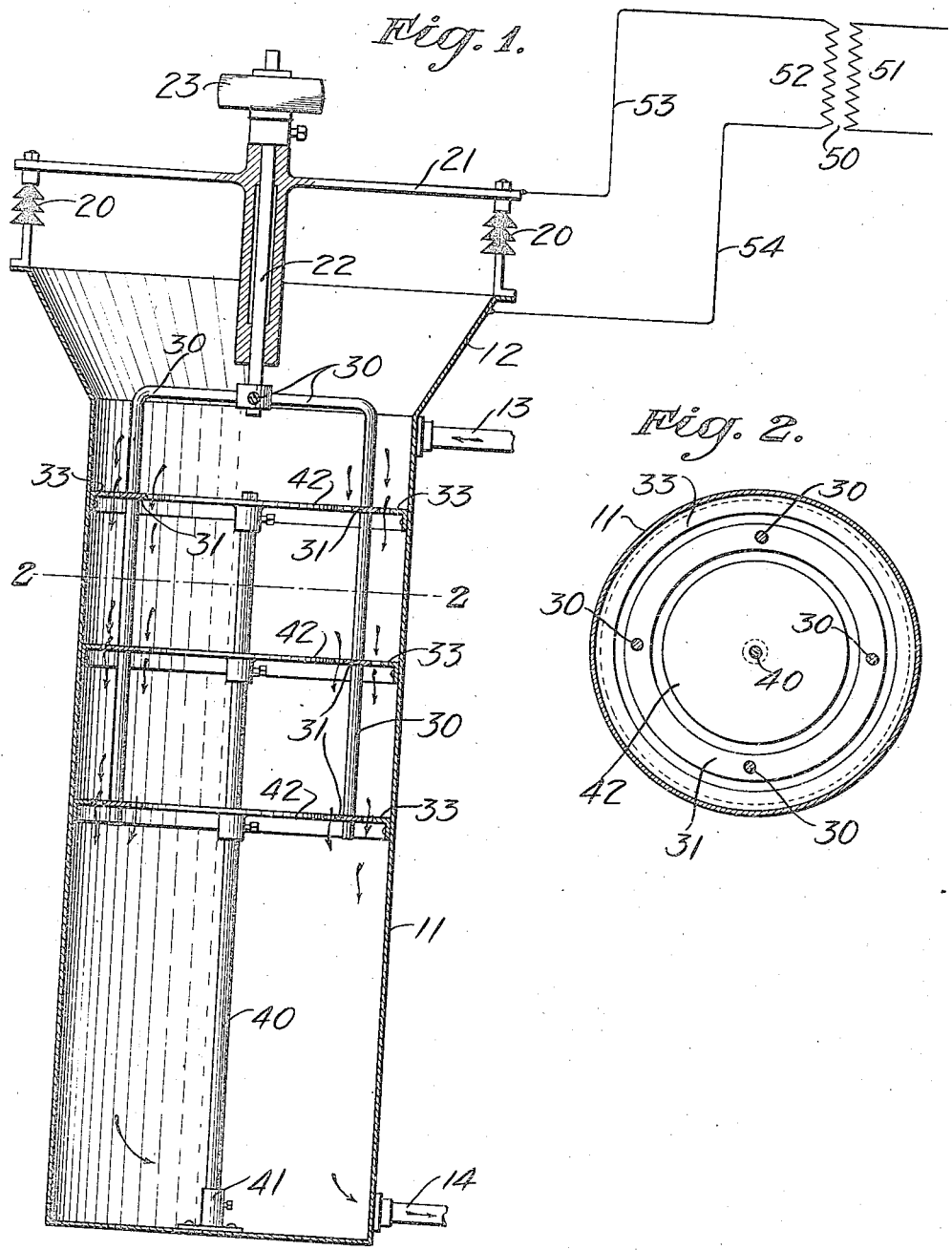

1,440,774

UNITED STATES PATENT OFFICE.

WILLIAM O. EDDY, OF LOS ANGELES, CALIFORNIA, ASSIGNOR TO PETROLEUM RECTI-FYING COMPANY OF CALIFORNIA, OF SAN FRANCISCO, CALIFORNIA, A CORPORATION OF CALIFORNIA.

ELECTRICAL DEHYDRATOR.

Application filed December 19, 1921. Serial No. 523,368.

*To all whom it may concern:*

Be it known that I, WILLIAM O. EDDY, a citizen of the United States, residing at Los Angeles, in the county of Los Angeles and State of California, have invented a new and useful Improvement in Electrical Dehydrators, of which the following is a specification.

My invention relates to dehydrators which are adapted to remove the water from petroleum emulsions. It is a well known fact that if such emulsions are passed through an electric field of sufficiently high intensity that the fine water particles in that field are agglomerated into larger masses which will readily separate therefrom by gravity. There have been developed various types of electric dehydrators for accomplishing this result.

The principal object of my invention is to produce such a dehydrator in which the capacity will be large and in which there will be great certainty of operation.

Further objects and advantages will be made evident hereinafter.

Referring to the drawing which is for illustrative purposes only:

Fig. 1 is a vertical section through a preferred embodiment of my invention, and, Fig. 2 is a section on a plane represented by the line 2—2 of Fig. 1.

In the form of the invention shown a shell 11 is provided having an enlarged top 12 and having an inlet pipe 13 through which the emulsion to be treated is passed. A pipe 14 is provided for withdrawing the treated oil and the separated water from the bottom of the tank. Supported on insulators 20 in the top of the tank is a spider 21. Turning freely in the spider is a shaft 22, this shaft being turned by means of a belt, not shown, which passes around a pulley 23 or by any other convenient practical means. Suspended on the bottom of the shaft 23 are four rods 30 which pass through annular members 31, and are secured thereto by any convenient means such, for example, as by welding. Secured to the inside of the tank 11 are three angle iron rings 33 having a circular opening therein concentric with the outer surface of the rings 31. The spaces between the rings 31 and the rings 33 form an outer electric field.

Supported on a column 40 in a standard 41 secured in the bottom of the shell is a series of discs 42 which are cylindrical in contour and which are concentric with the inner edge of the rings 31. The spaces between the discs 42 and the rings 31 form an inner electric field.

A transformer 50 is provided, this transformer having a low tension primary 51 and a high tension secondary 52. The secondary is connected through a wire 43 with the spider 21 and through a wire 54 with the tank 11. An electro-motive force is thus impressed across the outer field between the members 31 and 33 and across the inner field between the members 31 and the member 42. The emulsion passes through these fields and the water particles therein are agglomerated in that passage.

I claim as my invention:

1. A dehydrator for petroleum emulsions comprising a tank having a circular inner surface forming one terminus of an outer electric field; a stationary structure in said tank having a circular outer surface forming one terminus of an inner electric field; an electrically conducting member having a circular outer surface forming the inner terminus for said outer electric field and a circular inner surface forming the outer terminus for said inner electric field; means for electrically connecting said stationary structure to said tank; and means for impressing an electromotive force between said tank with its stationary structure and said electrically conducting member.

2. A dehydrator for petroleum emulsions comprising a tank having a circular inner surface forming one terminus of an outer electric field; a stationary structure in said tank having a circular outer surface forming one terminus of an inner electric field; an electrically conducting member having a circular outer surface forming the inner terminus for said outer electric field and a circular inner surface forming the outer terminus for said inner electric field; means for rotating said member about the center of its circular outer surface; means for electrically connecting said stationary structure to said tank; and means for impressing an electromotive force between said tank with its stationary structure and said electrically conducting member.

3. A dehydrator for petroleum emulsions comprising a tank having a circular inner surface forming one terminus of an outer electric field; a stationary structure in said tank having a circular outer surface forming one terminus of an inner electric field; an electrically conducting member having a circular outer surface forming the inner terminus for said outer electric field and a circular inner surface forming the outer terminus for said inner electric field; means for electrically connecting said stationary structure to said tank; a pipe for introducing emulsion into said tank; a pipe for withdrawing cleaned oil from said tank, said pipes being so placed that oil passing from one to the other must pass through either said outer or said inner field; and means for impressing an electromotive force between said tank with its stationary structure and said electrically conducting member.

4. A dehydrator for petroleum emulsions comprising a tank having a circular inner surface forming one terminus of an outer electric field; a stationary structure in said tank having a circular outer surface forming one terminus of an inner electric field; an electrically conducting member having a circular outer surface forming the inner terminus for said outer electric field and a circular inner surface forming the outer terminus for said inner electric field; means for rotating said member about the center of its circular outer surface; means for electrically connecting said stationary structure to said tank; a pipe for introducing emulsion into said tank; a pipe for withdrawing cleaned oil from said tank, said pipes being so placed that oil passing from one to the other must pass through either said outer or said inner field; and means for impressing an electromotive force between said tank with its stationary structure and said electrically conducting member.

In testimony whereof, I have hereunto set my hand at Los Angeles, California, this 13th day of December, 1921.

WILLIAM O. EDDY.